US011464374B2

(12) United States Patent
Jeong et al.

(10) Patent No.: US 11,464,374 B2
(45) Date of Patent: Oct. 11, 2022

(54) ROBOT CLEANER

(71) Applicant: Samsung Electronics Co., Ltd., Suwon-si (KR)

(72) Inventors: Kyung Han Jeong, Suwon-si (KR); Byung Chan Kim, Yongin-si (KR); Woo Ram Oh, Suwon-si (KR); Kyu Ha Lee, Yongin-si (KR); Byoung In Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 931 days.

(21) Appl. No.: 16/096,963

(22) PCT Filed: Apr. 11, 2017

(86) PCT No.: PCT/KR2017/003920
§ 371 (c)(1),
(2) Date: Oct. 26, 2018

(87) PCT Pub. No.: WO2017/188627
PCT Pub. Date: Nov. 2, 2017

(65) Prior Publication Data
US 2019/0117028 A1  Apr. 25, 2019

(30) Foreign Application Priority Data
Apr. 26, 2016  (KR) .......................... 10-2016-0051005

(51) Int. Cl.
*A47L 9/00* (2006.01)
*A47L 9/28* (2006.01)
(Continued)

(52) U.S. Cl.
CPC ............. *A47L 9/0072* (2013.01); *A47L 9/066* (2013.01); *A47L 9/0653* (2013.01); *A47L 9/28* (2013.01);
(Continued)

(58) Field of Classification Search
CPC ...... A47L 9/0072; A47L 9/0653; A47L 9/066; A47L 9/28; A47L 9/2805; A47L 9/2836;
(Continued)

(56) References Cited

U.S. PATENT DOCUMENTS 5,101,534 A * 4/1992 Watanabe ............. A47L 9/0411
15/377
2002/0083552 A1* 7/2002 Dilger ................... A47L 9/0613
15/373

FOREIGN PATENT DOCUMENTS

CN 104138238 A 11/2014
EP 2875765 A1 5/2015
(Continued)

OTHER PUBLICATIONS

ISA/KR, "International Search Report and Written Opinion of the International Searching Authority," International Application No. PCT/KR2017/003920, dated Jul. 25, 2017, 13 pages.
(Continued)

*Primary Examiner* — David Redding

(57) ABSTRACT

Disclosed is a robot cleaner which adjusts a suction area of air suctioned into a suction port through a shutter and a shutter driving device configured to operate the shutter, so that a flow rate of air is adjusted, thus more effectively suctioning dust in the air by using a fan motor having a fixed capacity.

14 Claims, 14 Drawing Sheets

(51) Int. Cl.
*A47L 9/06* (2006.01)
*G05D 1/02* (2020.01)
*B25J 9/16* (2006.01)
*B25J 9/00* (2006.01)
*B25J 11/00* (2006.01)

(52) U.S. Cl.
CPC .......... *A47L 9/2805* (2013.01); *A47L 9/2836* (2013.01); *A47L 9/2852* (2013.01); *B25J 9/00* (2013.01); *B25J 9/16* (2013.01); *B25J 9/1679* (2013.01); *B25J 11/00* (2013.01); *B25J 11/0085* (2013.01); *G05D 1/02* (2013.01); *G05D 1/021* (2013.01); *A47L 2201/00* (2013.01); *A47L 2201/06* (2013.01)

(58) Field of Classification Search
CPC ............... A47L 9/2852; A47L 2201/00; A47L 2201/06; A47L 9/2826; B25J 9/00; B25J 9/16; B25J 9/1679; B25J 11/00; B25J 11/0085; B25J 9/0003; G05D 1/02; G05D 1/021; G05D 1/0238; G05D 2201/0215; Y02B 40/00
See application file for complete search history.

(56) References Cited

FOREIGN PATENT DOCUMENTS

| | | |
|---|---|---|
| JP | H04-197223 A | 7/1992 |
| JP | 2007-252643 A | 10/2007 |
| JP | 2010-284353 A | 12/2010 |
| KR | 20-0144970 Y1 | 6/1999 |
| KR | 10-0474086 B1 | 3/2005 |
| KR | 10-2014-0041229 A | 4/2014 |

OTHER PUBLICATIONS

Supplementary European Search Report dated Mar. 26, 2019 in connection with European Patent Application No. 17 78 9812, 6 pages.
Korean Intellectual Property Office, "Request for the Submission of an Opinion," dated Jul. 11, 2022, in connection with Korean Patent Application No. 10-2016-0051005, 20 pages.

* cited by examiner

ROBOT CLEANER

CROSS-REFERENCE TO RELATED APPLICATIONS

This application is a 371 National Stage of International Application No. PCT/KR2017/003920 filed Apr. 11, 2017, which claims priority to Korean Patent Application No. 10-2016-0051005 filed Apr. 26, 2016, the disclosures of which are herein incorporated by reference in their entirety.

BACKGROUND

1. Field

Embodiments of the disclosure relates to a robot cleaner, and more particularly to a robot cleaner capable of suctioning dust more effectively.

2. Description of Related Art

In general, a robot cleaner is a device that cleans automatically an area to be cleaned by suctioning foreign substances, such as dust, from the floor while traveling the area by itself according to a preset program without a user's operation.

The robot cleaner includes a fan motor to generate a suction force therein, and the maximum suction force of the robot cleaner is determined by the capacity of the fan motor.

SUMMARY

It is an aspect of the present disclosure to provide a robot cleaner capable of efficiently suctioning dust by varying a suction force with a fan motor having a fixed capacity.

In accordance with one aspect of the present disclosure, a robot cleaner includes a suction unit provided at a lower surface thereof with a suction port to suction air, a shutter installed at a front side of the suction port so as to be movable up and down, a shutter driving device configured to move the shutter up and down, and a controller configured to control upward and downward movements of the shutter driving device.

The suction unit may be provided on a lower surface thereof with a plurality of suction guide grooves to guide air introduced into the suction port, the suction guide grooves provided at a front side of the suction port, and the shutter opens or closes rear sides of the plurality of the suction guide grooves by moving up and down.

The suction port may extend in a widthwise direction of the suction unit, and the shutter includes a plurality of shutter portions corresponding to the plurality of suction guide grooves, respectively.

The shutter may include an elevation guide portion configured to guide upward and downward movements of the shutter, and the plurality of the shutter portions extend downward from the elevation guide portion.

The suction unit may further include a suction portion formed in a hollow semi-cylindrical shape, an axis of which extends in the horizontal direction and a lower side of the suction portion forms the suction port, the elevation guide portion has an arc-shaped cross section to correspond to an outer circumferential surface of the suction portion.

The suction unit may further include a lower frame configured to form the lower surface thereof and have the suction port and the suction guide groove provided therein, wherein the lower frame includes a plurality of through holes provided between the suction port and the suction guide grooves such that the plurality of shutter portions pass through the plurality of through holes.

A shutter guide portion may be provided on both sides of each of the plurality of through holes to guide upward and downward movements of the shutter portion.

The shutter may include at least one rack portion, the shutter driving device includes a driving motor, a driving gear rotated by the driving motor, at least one driven gear engaged with the at least one rack portion, and a timing belt transmitting a power from the driving gear to the at least one driven gear.

The shutter may include a rack portion, the shutter driving device includes a driving motor and a pinion engaged with the rack portion and rotated by the driving motor.

The shutter may include a cam hole extending obliquely upwardly, the shutter driving device includes a cam shaft installed to be movable toward one side of the shutter driving device, and a cam protrusion protruding from the camshaft and inserted into the cam hole.

The shutter driving device may include an actuator configured to move the camshaft in one direction.

The shutter driving device may include a driving motor, gears rotated by the driving motor, a worm gear rotated by receiving a rotary force through the gears, and a rack gear mounted on the camshaft and engaged with the worm gear.

The shutter driving device may include a driving motor and a rotating cam rotated by the driving motor in forward and reverse directions and configured to move the camshaft forward and backward.

The controller controls the shutter driving device to alternate between moving the shutter upward and moving the shutter downward, alternate between a first state that the shutter is moved upward and a second state that the shutter is moved downward.

A time duration of the first state that the shutter is moved downward may be set to be longer than a time duration of the second state that the shutter is moved upward.

The robot cleaner may further include a sensor configured to detect a wall, wherein the controller controls the shutter driving device to move the shutter downward when the sensor detects a surface of the wall.

The robot cleaner may further include a sensor configured to detect a carpet, wherein the controller controls the shutter driving device to move the shutter downward when the sensor detects the carpet being cleaned by the sensor.

The robot cleaner may further includes a sensor configured to detect a size of the dust, the controller controls the shutter driving device to move the shutter upward when the sensor detects a dust larger than a predetermined size on the floor.

The robot cleaner may further includes an input unit allowing a user to directly control the shutter driving device, wherein the controller controls the shutter driving device to move the shutter according to a user instruction input by the input unit.

As is apparent from the above, the robot cleaner according to one aspect of the disclosure can adjust a flow rate of air suctioned by moving the shutter such that an area of the flow path through which dust is suctioned is adjusted.

In addition, the robot cleaner according to another aspect of the disclosure can efficiently suction dust on the floor by moving the shutter to the lower side such that a flow of air being introduced into the suction portion is formed at a position adjacent to the floor.

DETAILED DESCRIPTION

A robot cleaner in accordance with embodiments of the disclosure will now be described in detail with reference to the accompanying drawings.

Figure 1:
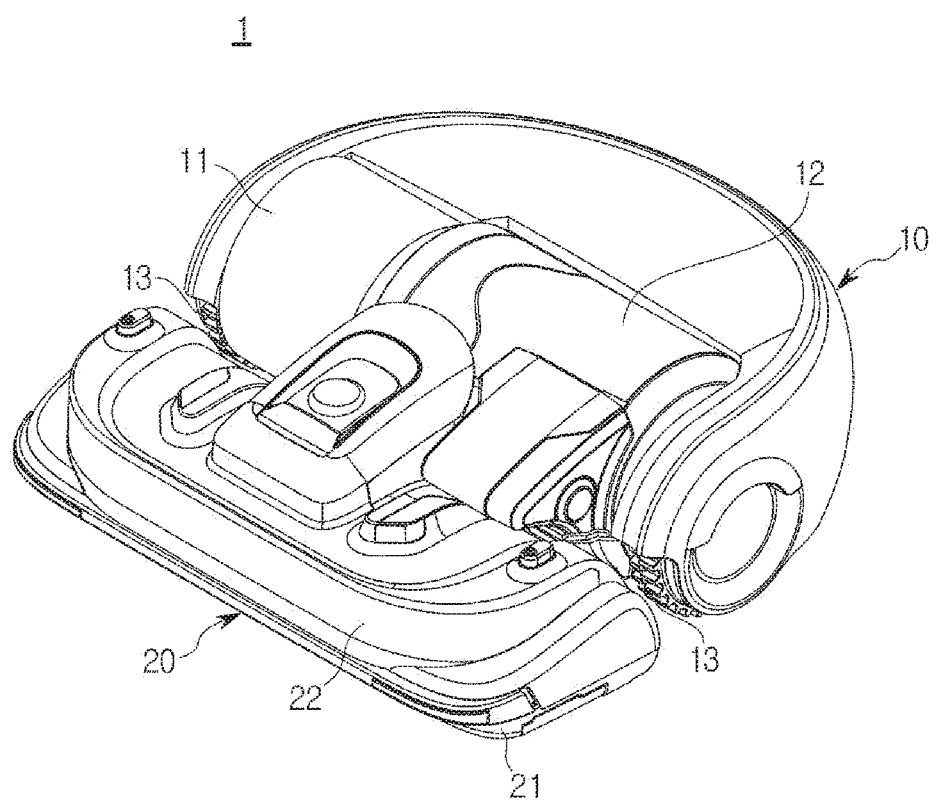
FIG. 1 is a perspective view illustrating a robot cleaner according to a first embodiment of the present disclosure.

FIG. 1 is a perspective view illustrating a robot cleaner according to a first embodiment of the present disclosure.

A robot cleaner 1 includes a main body 10 forming an outer appearance of the robot cleaner 1 and a suction unit 20 coupled to a front side of the main body 10 to suction air from a floor.

The main body 10 includes a fan motor 11 to generate a suction force and a dust container 12 to store foreign substances, such as dust, filtered from air suctioned by the suction unit 20. Wheels 13 rotated by a wheel driving device (not shown) included in the main body 10 is mounted on both sides of the main body 10 and allows the robot cleaner 1 to travel.

Figure 2:
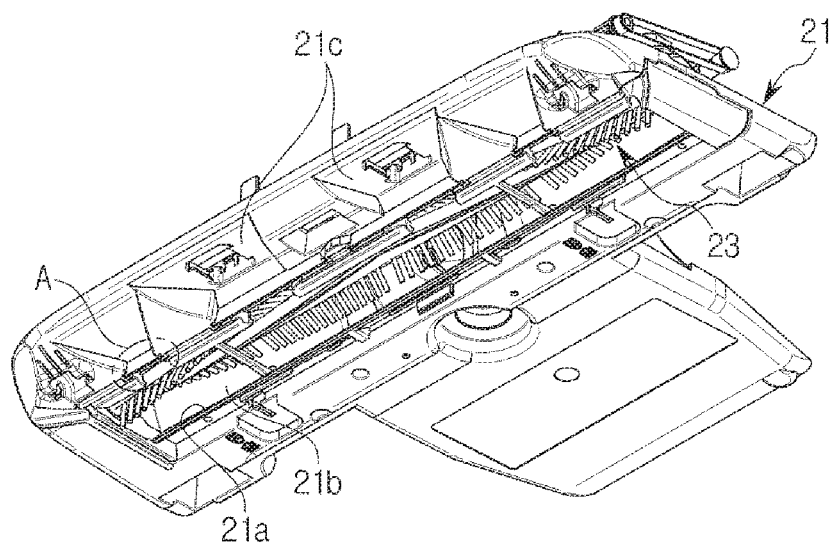
FIG. 2 is a bottom perspective view illustrating a suction unit applied to the robot cleaner according to the first embodiment of the present disclosure.

The suction unit 20 suctions foreign substances on the floor together with air by the suction force transmitted from the fan motor 11. The suction unit 20 is formed by coupling a lower frame 21 forming a lower surface of the suction unit 20 to an upper frame 22 forming an upper surface of the suction unit 20 in a vertical direction. Referring to FIG. 2, a suction port 21a is provided on a lower surface of the lower frame 21 to suction dust together with air from the floor. The lower frame 21 has a suction portion 21b. The suction portion 21b is formed in a hollow semi-cylindrical shape extending in a width direction of the robot cleaner 1, and a lower side of the suction portion 21b forms the suction port 21a. A brush 23 is rotatably installed in the suction portion 21b so as to sweep dust on the floor.

A plurality of suction guide grooves 21c are provided on the lower surface of the lower frame 21 to guide air suctioned into the suction port 21a. The plurality of suction guide grooves are provided at the front side of the suction port 21a. The plurality of suction guide grooves 21c are provided so as to be spaced apart from each other in the width direction of the robot cleaner 1. The suction guide grooves 21c are formed to have a width that decreases in a direction toward the rear side of the robot cleaner 1, so that a flow rate of the air passing through the suction guide grooves 21c increases in a direction toward the rear side of the robot cleaner 1.

Figure 3:
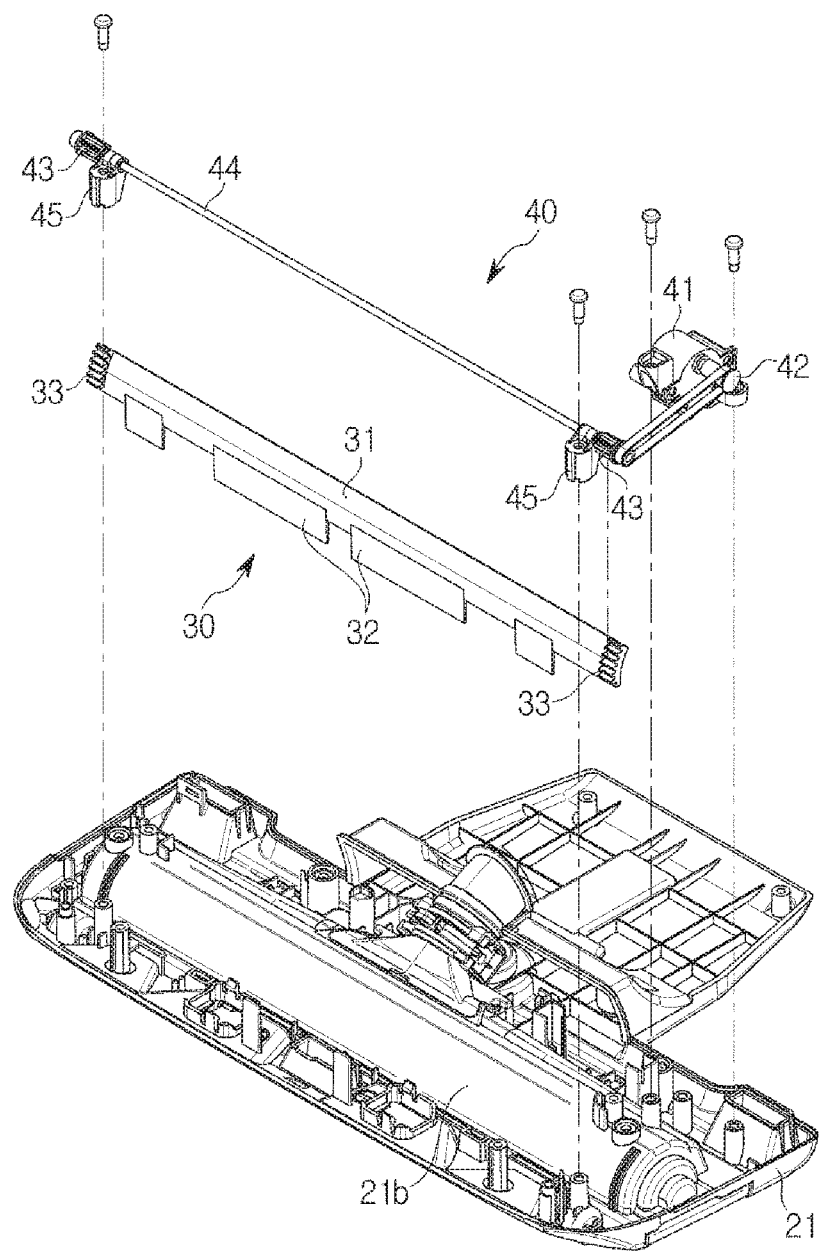
FIG. 3 is an exploded perspective view illustrating a shutter and a shutter driving device applied to the robot cleaner according to the first embodiment of the present disclosure.

Referring to FIG. 3, the robot cleaner 1 according to the present disclosure includes a shutter 30 and a shutter driving device 40 to more efficiently suction dust on the floor by the fan motor 11 having a fixed capacity.

The shutter 30 is installed on the lower frame 21 of the suction unit 20 to be movable up and down. The shutter 30 adjusts a flow path area of air suctioned into the suction port 21a by moving up and down. The shutter 30 includes an elevation guide portion 31 and a plurality of shutter portions 32. The elevation guide portion 31 receives a power from the shutter driving device 40 and moves the shutter 30 up and down. The shutter portion 32 extends downward from the elevation guide portion 31 and adjusts an area of a flow path of the air suctioned into the suction port 21a.

The elevation guide portion 31 has an arc shape cross section to correspond to an outer circumferential surface of the suction portion 21b so that the elevation guide portion is moved along the outer circumferential surface of the suction portion 21b. A pair of rack portions 33 is provided on both sides of the elevation guide portion 31 to receive power from the shutter driving device 40.

The shutter portions 32 are formed of flexible material so as to move smoothly along through holes 21d which will be described later. A plurality of the shutter portions 32 are spaced apart from each other in a widthwise direction of the robot cleaner 1. Accordingly, rear sides of the suction guide grooves 21c are opened and closed according to up and down movements of the shutter 30.

Figure 4:
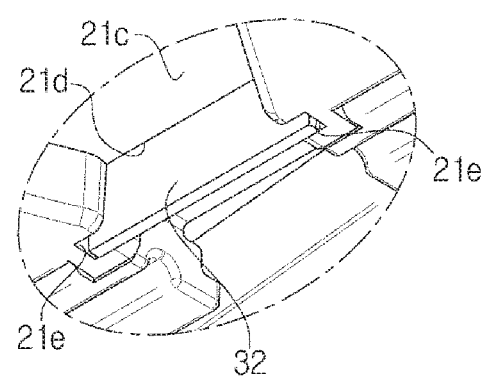
FIG. 4 is an enlarged view of part A of FIG. 2.

Referring to FIG. 4, the lower frame 21 is provided with a plurality of through holes 21d so that the shutter portions 32 may protrude downward while passing through the lower frame 21. A shutter guide portion 21e is provided on both sides of the shutter portion 32 to movably support the both sides of the shutter portions 32 and guide up and down movement of the shutter portion 32. The through holes 21d are extended in the widthwise direction of the robot cleaner 1 and have a width larger than a thickness of the shutter portion 32. The shutter portions 32 are disposed adjacent to a rear surface of the through holes 21d.

Referring to FIG. 3, the shutter driving device 40 includes a driving motor 41 to generate a rotational force, a driving gear 42 rotated by the driving motor 41, a pair of driven gears 43 engaged with the rack portions 33 of the shutter 30 and rotated by a rotational force received through a timing belt. The pair of driven gears 43 is connected to each other via a connecting shaft 44 so as to rotate together. The connecting shaft 44 is rotatably installed on the lower frame 21 through a pair of shaft supporting brackets 45. The pair of the support brackets 45 is fixed to the lower frame 21.

Accordingly, when the shutter 30 is moved upward by the shutter driving device 40, the suction guide groove 21c is opened, and thus air is suctioned into the suction port 21a through the suction guide groove 21c. When the shutter 30 is moved downward by the shutter driving device 40, the suction guide groove 21c is closed by the shutter driving device 40, and thus air is suctioned through a narrow space between a lower end of the shutter 30 and the floor.

Figure 5:
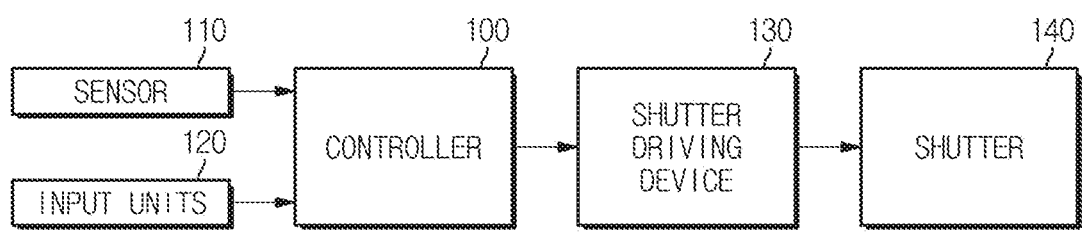
FIG. 5 is a block diagram of the robot cleaner according to the first embodiment of the present disclosure.

Referring to FIG. 5, the robot cleaner 1 includes a controller 100 to control operations of the robot cleaner 1, various sensors 110 to check a location of the robot cleaner 1 and surrounding geographic features or detect a velocity of the wheels 13, and various input units 120 to allow a user to select an operation of the robot cleaner 1. The input units include buttons or a remote controller.

Figure 6:
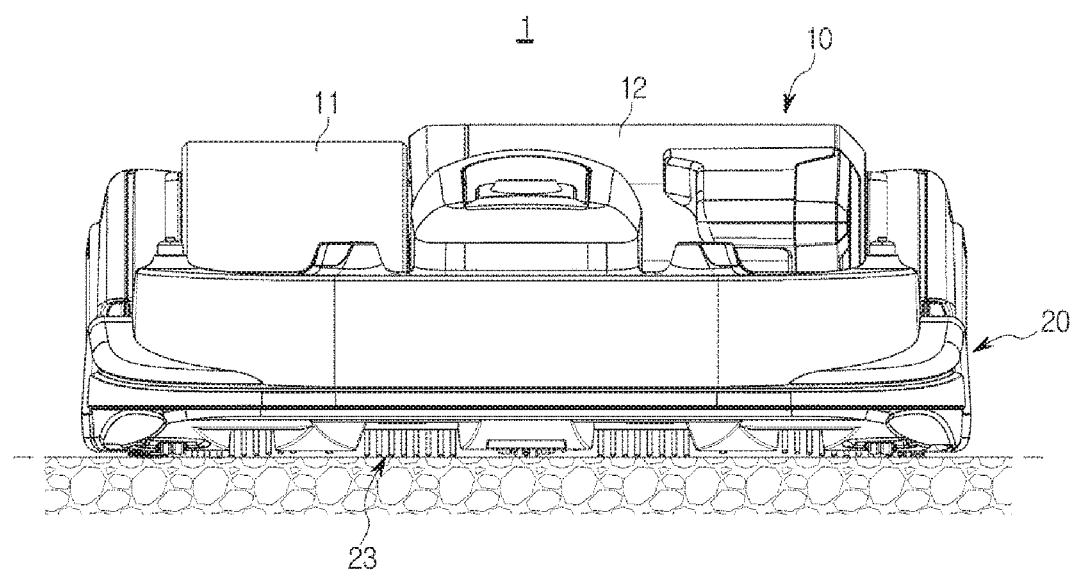
FIGS. 6 and 7 are front views illustrating operations of the shutter of the robot cleaner according to the first embodiment of the present disclosure.
Figure 7:
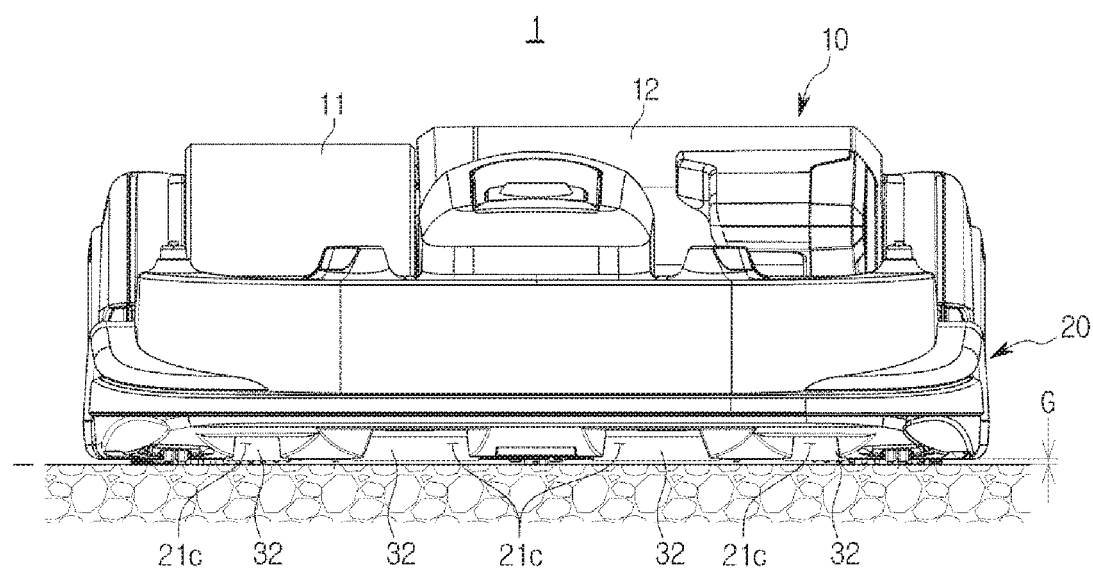

When the robot cleaner 1 cleans an area distant away from a wall, the controller 100 controls the shutter driving device 40 to move the shutter 30 upward as shown in FIG. 6. When the shutter 30 is moved upward, the suction guide grooves 21c are opened, and thus air and dust are suctioned into the suction port 21a through the suction guide grooves 21c.

When the sensor 110 (or the like) detects that the robot cleaner 1 is located at a position adjacent to the wall, the controller 100 controls the shutter driving device 40 to move the shutter 30 downward. When the shutter 30 is moved downward, the suction guide grooves 21c are closed, and thus air and dust are suctioned into the suction port 21a through the narrow space between the lower end of the shutter portion 32 and the floor. Therefore, air passes through the narrow space between the lower end of the shutter portion 32 and the floor at a higher speed, so that the dust on the floor is suctioned into the robot cleaner 1 more easily.

In addition, the controller 100 may control the shutter driving device 40 to move the shutter 30 downward only when the robot cleaner 1 is located at a position adjacent to the corner of an indoor space instead of the position adjacent to the wall. That is, when the sensor 110 detects that the robot cleaner 1 is located at a position adjacent to two walls at the same time, the controller 100 recognizes that the robot cleaner 1 is located at a position adjacent to the corner. When the robot cleaner 1 is located at the position adjacent to the corner, the controller 100 moves the shutter 30 downward.

In addition, when the robot cleaner 1 cleans an area distant away from the wall or the corner, the robot cleaner 1 cleans the floor in a state that the suction guide groove 21c is opened by the shutter 30 or the suction guide groove 21c is closed by the shutter 30. And when the sensor 110 detects that the robot cleaner 1 is located at a position adjacent to the wall or the corner, the controller 100 controls the shutter driving device 40 to move the shutter up and down periodically.

In addition, the robot cleaner 1 cleans a general floor, the shutter 30 remains moved upward, and when the sensor 110 detects that the robot cleaner 1 cleans an area where a carpet is located, the shutter 30 is moved downward.

As described above, when the shutter 30 is moved downward while the robot cleaner 1 is passing through the area where the carpet is located, the shutter 30 performs both a function of increasing a flow rate of air and a function of guiding air to an area adjacent to the carpet. Accordingly, the cleaning of the carpet may be achieved more efficiently.

In addition, when the robot cleaner 1 cleans a general floor, the shutter 30 may be periodically moved up and down. That is, the shutter driving device 40 is controlled by the controller 100 to move the shutter 30 downward for a predetermined holding time such that the robot cleaner 1 cleans the floor in a state that the shutter 30 is moved downward. After a predetermined duration time, the shutter driving device 40 is controlled by the controller 100 to move the shutter 30 upward for a predetermined duration time so that the robot cleaner 1 cleans the floor in a state that the shutter 30 is moved upward. Accordingly, dust having a predetermined size or below passes through the narrow space between the lower end of the shutter 30 and the floor in a state that the shutter 30 is moved downward, and is suctioned into the suction port 21a. Dust equal to or larger than the predetermined size may not pass through the narrow space between the lower end of the shutter 30 and the floor. The large size dust is suctioned into the suction port 21a through the suction guide groove 21c in a state that the shutter 30 is moved upward.

That is, the small size dust on the floor is suctioned at a high speed in the state in which the shutter 30 is moved downward, thereby the small size dust may be efficiently suctioned and cleaned. The large size dust caught by the lower end of the shutter 30 moved downward may be removed in a state in which the shutter 30 is moved upward.

In this case, a duration time for which the shutter 30 is moved downward may be set to be longer than a duration time for which the shutter 30 is moved upward. Since a larger suction force acts on the ground when the shutter 30 is moved downward, the longer duration time in a state in which the shutter 30 is moved downward, the more efficiently dust and foreign matters on the floor are suctioned.

In addition, the user may directly operate the shutter driving device 40 through the input unit 120, such as buttons provided on the robot cleaner 1 or a remote controller. That is, when the user directly confirms a state of the floor and inputs a user instruction to the controller 100 through the input unit 120 provided on the robot cleaner 1 or the remote controller, the controller 30 controls the shutter driving device 40 to perform an operation of the shutter 30 opening the suction guide groove 21c or an operation of the shutter 30 closing the suction guide groove 21c in accordance with the input user instruction. In addition, an operation of the shutter 30 opening the suction guide groove 21c for a predetermined time and an operation of the shutter 30 closing the suction guide groove 21c for a predetermined time may be repeated.

Although not shown in the drawings, the robot cleaner 1 may include a sensor 110 that detects the size of dust.

The robot cleaner 1 including the sensor 110 to detect the size of dust may operate as follows.

First, when only small size dust less than a predetermined size exit on the floor, the sensor detects that the size of the dust is less than the predetermined size. Then the size of dust is transmitted to the controller 100, and the controller 100 controls the shutter driving device 40 to move the shutter 30 downward. The small size dust is suctioned through the narrow space between the lower end of the shutter 30 and the floor at a high speed.

When large size dust or foreign matter lager than the predetermined size on the floor, the sensor 110 detects that the size of the dust is larger than the predetermined size. The size of dust is transmitted to the controller 100. The controller 100 controls the shutter driving device 40 to move the shutter 30 upward so that the suction guide groove 21c is opened. Therefore, the large size dust larger than the predetermined size is suctioned into the suction port 21a through the suction guide groove 21c.

Figure 8:
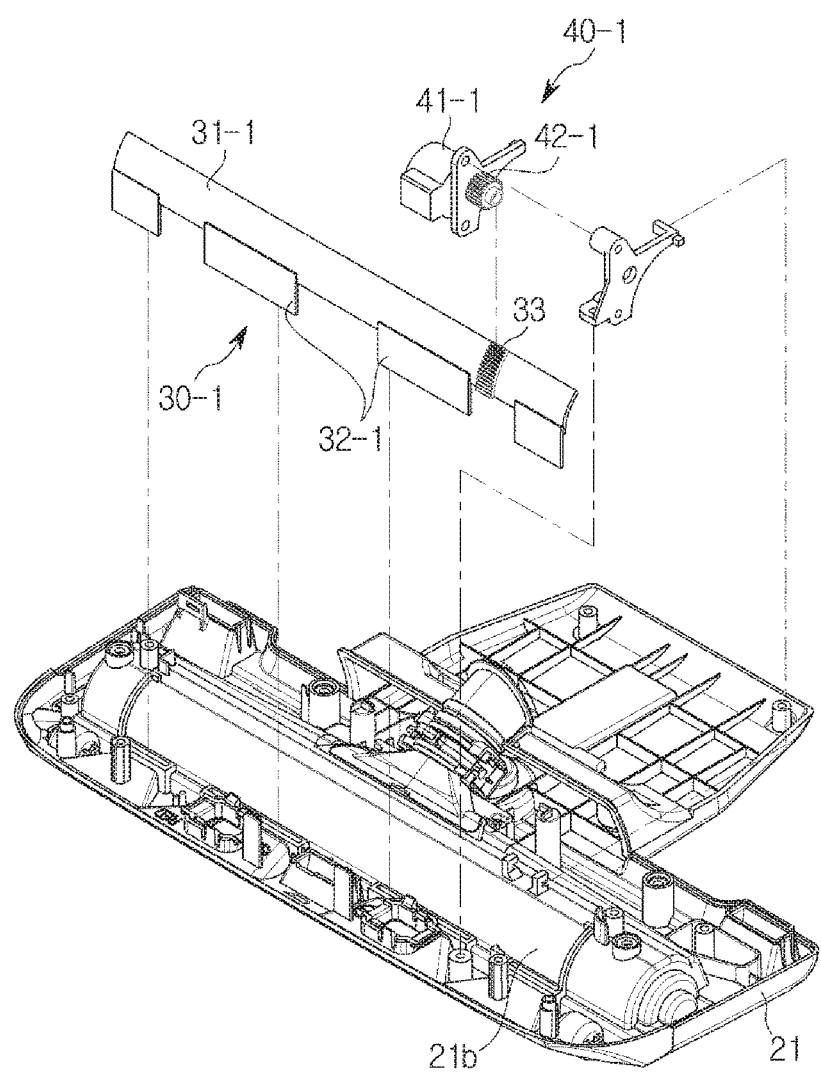
FIG. 8 is an exploded perspective view illustrating a shutter and a shutter driving device applied to the robot cleaner according to a second embodiment of the present disclosure.

According to a first embodiment, the shutter driving device 40 includes the driving motor 41, the driving gear 42, the driven gear 43, and a timing belt, but this is for illustrative purpose only. Referring to FIG. 8 which illustrates a second embodiment of the present disclosure, a shutter driving device 40-1 includes a driving motor 41-1 and a pinion 42-1, and a shutter 30-1 includes only one rack portion 33-1 to be engaged with a pinion 42-1.

Figure 9:
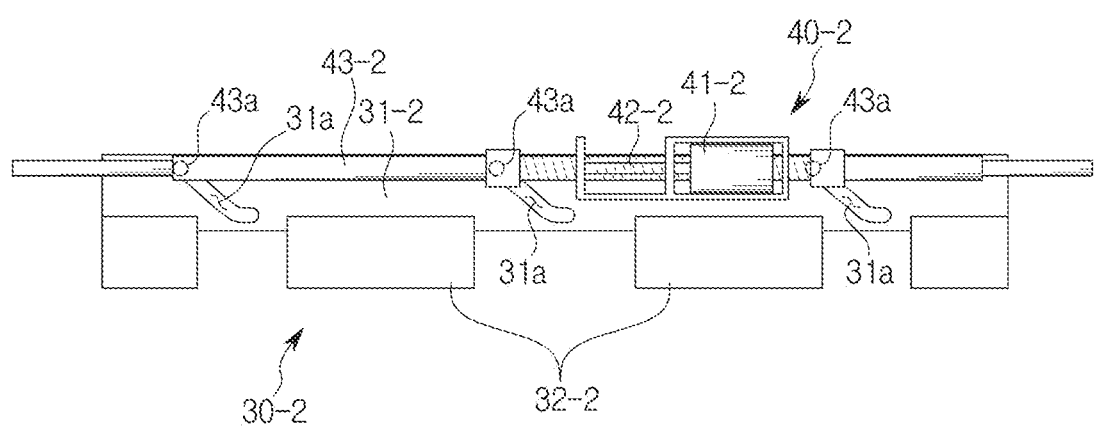
FIGS. 9 and 10 are schematic views illustrating operations of a shutter and a shutter driving device applied to the robot cleaner according to a third embodiment of the present disclosure.
Figure 10:
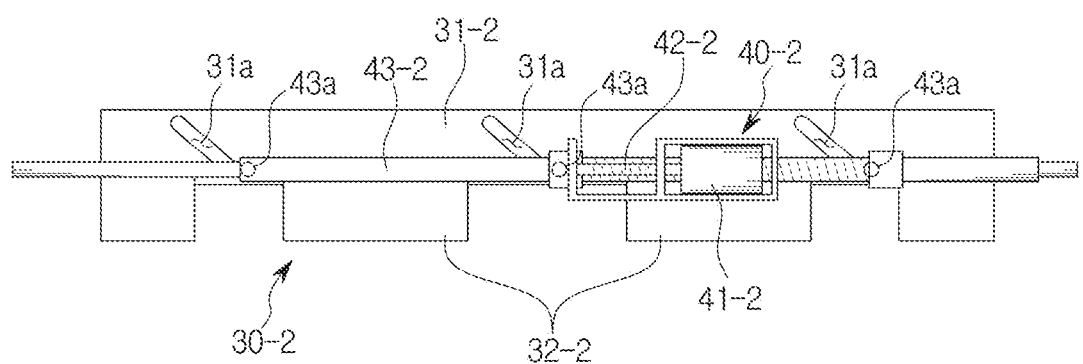

Referring to FIGS. 9 and 10 which illustrates a third embodiment of the present disclosure, a shutter 30-3 includes cam holes 31a provided in an elevation guide portion 31-3, and a shutter driving device 40-2 includes an actuator 41-2 having a plunger 42-2 and a camshaft 43-2 extending in the widthwise direction of the robot cleaner 1 to move in the widthwise direction.

The cam holes 31a extend obliquely toward the upper side of the elevation guide portion 31, and the cam shaft 43-2 includes cam protrusions 43a which are movably installed in the cam holes 31a. Therefore, as the camshaft 43-2 is moved in the left and right side directions by the plunger 42-2 of the actuator 41-2, the shutter 30-2 is moved up and down by a power which is received through the cam protrusion 43a and the cam holes 31a.

Figure 11:
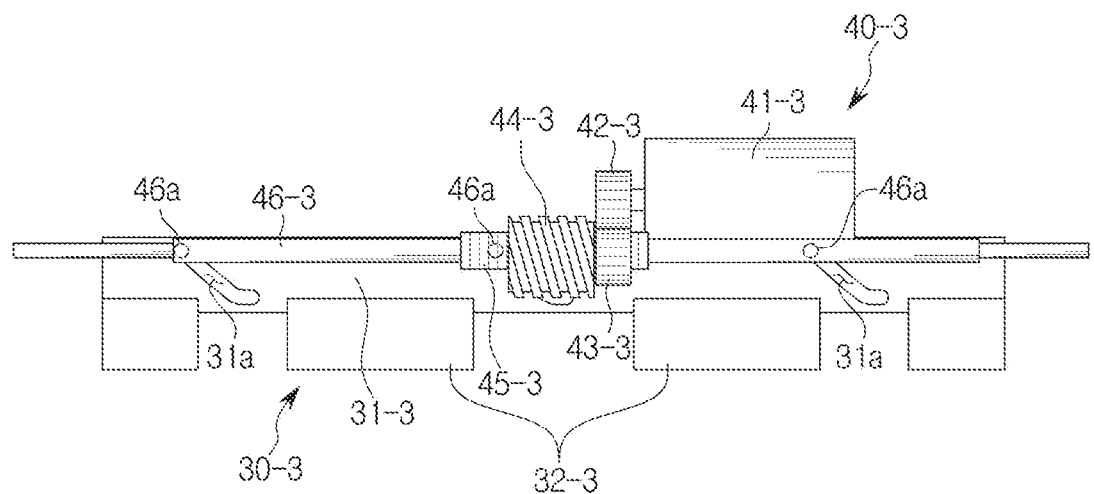
FIGS. 11 and 12 are schematic views illustrating operations of a shutter and a shutter driving device applied to the robot cleaner according to a fourth embodiment of the present disclosure.
Figure 12:
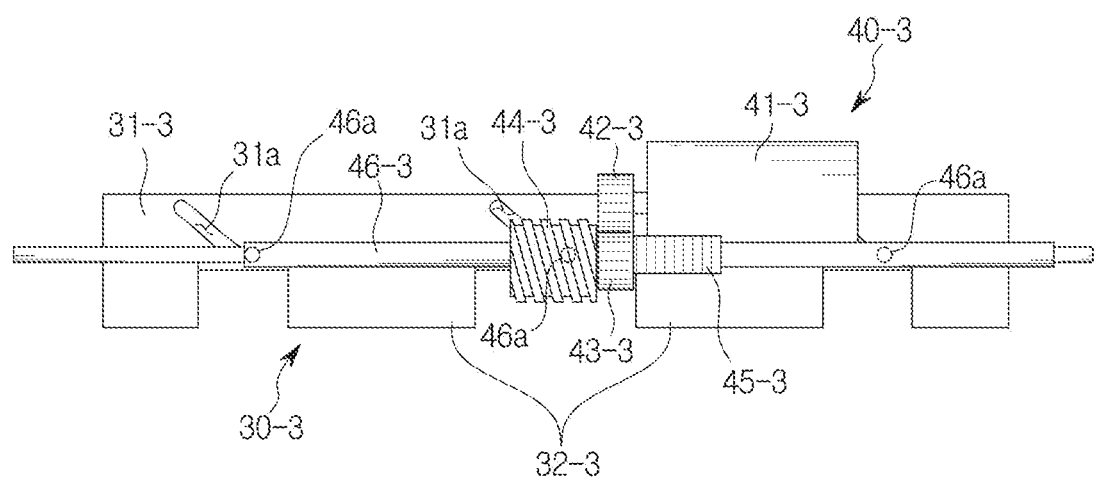

According to the third embodiment, the cam shaft 43-2 is moved in the left and right side directions by the actuator 41-2, but the present disclosure is not limited to this. As shown in FIGS. 11 and 12 illustrating a fourth embodiment of the present disclosure, a shutter driving device 40-3 includes a driving motor 41-3, gears 42-3 and 43-3 and a worm gear 44-3 rotated by the driving motor 41-3, a rack gear 45-3 engaged with the worm gear 44-3, and a cam shaft 46-3 movably installed in the left and right direction of the robot cleaner 1 and in which the rack gear 45-3 is installed.

In this case, as the cam shaft 46-3 moves in the left and right direction of the robot cleaner 1, the shutter 30-3 is moved up and down by a force which is received through the cam protrusion 46a and the cam holes 31a.

Figure 13:
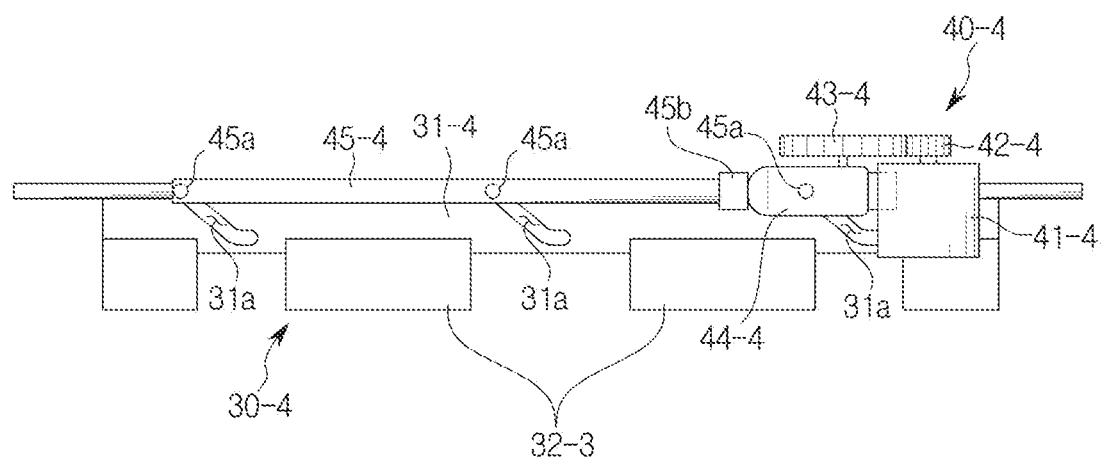
FIGS. 13 and 14 are schematic views illustrating operations of a shutter and a shutter driving device applied to the robot cleaner according to a fifth embodiment of the present disclosure.
Figure 14:
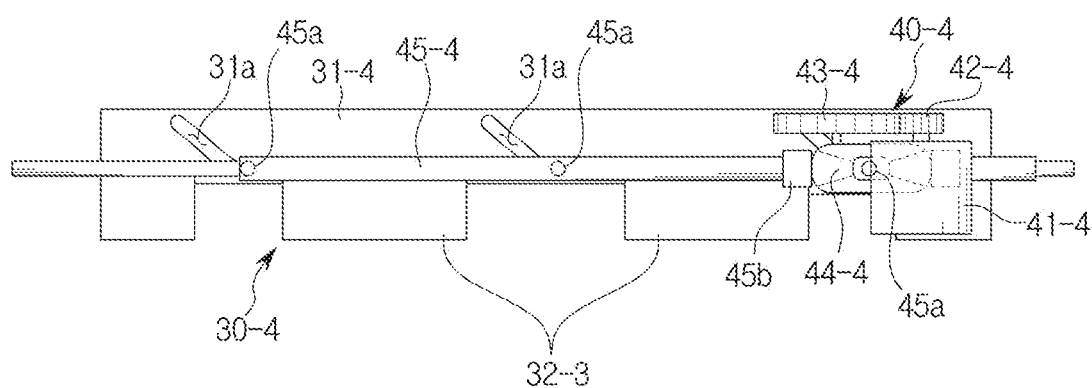

Referring to FIGS. 13 and 14 illustrating a fifth embodiment of the present disclosure, a shutter driving device 40-4 includes a driving motor 41-4, a rotation cam 44-4 rotated by receiving a rotational force from the driving motor 41-4 through gears 42-4 and 43-4, and a cam shaft 45-4 that moves back and forth in accordance with a rotation angle of the rotation cam 44-4.

In this case, as the cam shaft 46-4 moves in the left and right direction of the robot cleaner 1, the shutter 30-4 is moved up and down by a force which is received through the cam protrusion 45a and the cam holes 31a.

In the above embodiments, the robot cleaner 1 includes the main body 10 and the suction unit 20, and the suction port 21a is provided on the lower surface of the suction unit 20, but, it is also possible to form a suction port on a lower surface of the main body without a suction unit.

The present disclosure is not limited to the embodiments described above, and it should be clear to those skilled in the art that various changes and modifications thereto are possible without departing from the spirit and scope of the present disclosure. Therefore, the changes and modifications fall within the scope of the appended claims of the present disclosure.

The invention claimed is:

1. A robot cleaner comprises:
   a suction unit provided at a lower surface thereof and including:
      a suction port to suction air, and
      a plurality of suction guide grooves provided at a front side of the suction port and configured to guide air introduced into the suction port;
   a shutter installed at the front side of the suction port so as to be movable up and down and opens or closes rear sides of the plurality of the suction guide grooves by moving up and down;
   a shutter driving device configured to move the shutter up and down; and
   a controller configured to control upward and downward movements of the shutter driving device.

2. The robot cleaner according to claim 1, wherein:
   the suction port extends in a widthwise direction of the suction unit, and
   the shutter includes a plurality of shutter portions corresponding to the plurality of suction guide grooves, respectively.

3. The robot cleaner according to claim 2, wherein:
   the shutter includes an elevation guide portion configured to guide upward and downward movements of the shutter, and
   the plurality of the shutter portions extend downward from the elevation guide portion.

4. The robot cleaner according to claim 3, wherein:
   the suction unit further comprises a suction portion formed in a hollow semi-cylindrical shape, an axis of which extends in a horizontal direction and a lower side of the suction portion forms the suction port, and
   the elevation guide portion has an arc-shaped cross section to correspond to an outer circumferential surface of the suction portion.

5. The robot cleaner according to claim 2, wherein:
   the suction unit further comprises a lower frame configured to form the lower surface thereof and have the suction port and a suction guide groove provided therein, and
   the lower frame includes a plurality of through holes provided between the suction port and the suction guide grooves such that the plurality of shutter portions pass through the plurality of through holes.

6. The robot cleaner according to claim 5, a shutter guide portion is provided on both sides of each of the plurality of through holes to guide upward and downward movements of a shutter portion.

7. The robot cleaner according to claim 2, wherein:
   the shutter includes at least one rack portion, and
   the shutter driving device includes a driving motor, a driving gear rotated by the driving motor, at least one driven gear engaged with the at least one rack portion, and a timing belt transmitting a power from the driving gear to the at least one driven gear.

8. The robot cleaner according to claim 2, wherein:
   the shutter includes a rack portion, and
   the shutter driving device includes a driving motor and a pinion engaged with the rack portion and rotated by the driving motor.

9. The robot cleaner according to claim 8, wherein:
   the shutter includes a cam hole extending obliquely upwardly,
   the shutter driving device includes a camshaft installed to be movable toward one side of the shutter driving device, and
   a cam protrusion protruding from the camshaft and inserted into the cam hole.

10. The robot cleaner according to claim 8, wherein the shutter driving device includes an actuator configured to move a camshaft in one direction.

11. The robot cleaner according to claim 8, wherein the shutter driving device includes the driving motor, gears rotated by the driving motor, a worm gear rotated by receiving a rotary force through the gears, and a rack gear mounted on a camshaft and engaged with the worm gear.

12. The robot cleaner according to claim 8, wherein the shutter driving device includes the driving motor and a rotating cam rotated by the driving motor in forward and reverse directions and configured to move a camshaft forward and backward.

13. The robot cleaner according to claim 1, wherein the controller controls the shutter driving device to alternate between moving the shutter upward and moving the shutter downward.

14. The robot cleaner according to claim 13, wherein a time duration of a first state that the shutter is moved downward is set to be longer than a time duration of a second state that the shutter is moved upward.

\* \* \* \* \*